United States Patent
Walker

[15] 3,668,151
[45] June 6, 1972

[54] HIGH STRENGTH CATALYST PELLETS
[72] Inventor: Darrell W. Walker, Bartlesville, Okla.
[73] Assignee: Phillips Petroleum Company
[22] Filed: May 28, 1969
[21] Appl. No.: 828,772

[52] U.S. Cl. .................................. 252/466, 252/463, 23/52
[51] Int. Cl. ......................................................... B01j 11/22
[58] Field of Search .............. 260/680, 683.3; 252/466, 463; 23/52

[56] References Cited

UNITED STATES PATENTS

| 3,531,543 | 9/1970 | Clippinger | 260/683.3 |
| 2,269,508 | 1/1942 | Barton | 23/52 |
| 3,470,262 | 9/1969 | Michaels | 260/680 |
| 3,461,183 | 8/1969 | Hepp | 260/680 |
| 3,461,177 | 8/1969 | Box | 260/673.5 |
| 3,502,739 | 3/1970 | Begley | 260/680 |
| 3,511,883 | 5/1970 | Jenkins | 260/673.5 |

*Primary Examiner*—Daniel E. Wyman
*Assistant Examiner*—Philip M. French
*Attorney*—Young and Quigg

[57] ABSTRACT

A method of preparing a high strength catalyst pellet is disclosed which comprises calcining particulate ZnO admixed with particulate $Al_2O_3$. Additionally, a catalytic process using a prepared high strength catalyst is disclosed.

4 Claims, No Drawings

PORCELAIN ENAMELS FOR SELF-CLEANING COOKING OVEN

This is a divisional application of copending application Ser. No. 715,186, filed Mar. 22, 1968, now U.S. Pat. No. 3,598,650.

BACKGROUND OF THE INVENTION

The field of this invention may be described generally as residing in coatings for oven liners, and more particularly, to an improved porcelain enamel frit of such a composition that upon being incorporated into a porcelain enamel coating and applied to a suitable substrate, then heated to within a critical temperature range, food soils, commonly spattered on an oven liner during baking or broiling, are readily and completely oxidized to a fine ash residue which is easily removable from the oven enclosure.

Whereas, heretofore, self-cleaning ovens were found generally in electric ranges, the enamel of this invention provides a means for making gas ranges self-cleaning. That is, an electric range is, by design, capable of having self-cleaning portions thereof heated to high oxidation temperatures directly by elements placed along the reverse surfaces of the surfaces to be cleaned. A gas oven, on the other hand, could not be readily or practically designed so as to controllably elevate self-cleaning oven walls to oxidation temperatures by placing gas jets along the reverse surfaces thereof.

Accordingly, in order to effectively achieve a self-cleaning gas oven, it is essential that the interior, operating surface thereof be such that it will function at relatively low oxidation temperatures, and be capable of being brought up to those temperatures within an ambient oven atmosphere, utilizing standard oven baking or broiling burners conventionally positioned.

DESCRIPTION OF THE INVENTION

It is well known that an increase in oxygen in an atmosphere effectively reduces the temperature at which materials are oxidized. This is particularly noted when organic materials are exposed to atmospheres having a high percentage of oxygen. I have found that certain porcelain enamels produced from frits (glass), effectively supply oxygen when organic materials, such as food soils, are in contact with the enamel surface, and that oxygen from a normal atmosphere is adsorbed by the coating, which, it is theorized, is either stored or diffused throughout the enamel coating, thereby making available sufficient excess oxygen to promote the oxidation of food soils when the coating is subsequently heated in accordance with this invention.

This oxygen adsorption phenomenon seems to occur at about the same surface temperature as needed for oxidation of an organic soil material contacting the surface, and is greatly enhanced by the presence within, and homogeneously smelted throughout, the enamel frit, of certain oxidation inducing metal oxides, such as, but not limited to, cobalt oxide.

At this point, a review of U.S. Pat. No. 3,266,477 to Stiles will aid materially in an appreciation of the unexpected and startling results of the instant invention.

Stiles teaches the use of a number of catalyst materials dispersed on oven surfaces via a number of different media for the purpose of aiding in the oxidation of oven soils.

From the general teaching of Stiles, it will be apparent that it is critical to his invention that his catalyst materials be thinly distributed on the oven surface.

One of the methods by which Stiles achieves a thin distribution of his catalyst on an oven liner is by sticking same to the surface thereof, Stiles quite emphatically stating, at the bottom of column 2, lines 70–72 that, although he may distribute his catalyst material on the surface of an enamel coating and reheat the coating in order to "partially" embed his catalyst in the ceramic layer, that the catalyst should not be so deeply embedded as to obstruct access to his surface distributed catalyst. See also column 5, lines 25 et seq. wherein Stiles again stresses that it is absolutely essential that his catalyst particles do not become too deeply embedded in the enamel coating as cleaning inactivity would result.

Examples 4, and 10–18 inclusive of Stiles are specific embodiments of the utilization of a porcelain enamel as a base for Stiles' catalytic particles. Attention is particularly directed to the number of complex steps in each operation in order to achieve a workable catalytic surface layer on porcelain enamel.

By the very nature of Stiles' exposed catalytic layer the so-called catalytic particles of Stiles are highly susceptible to being removed by abrasion, thereby materially reducing their effectiveness after a period of time in use.

However, applicant has found, surprisingly, and directly contrary to the teachings of Stiles, that a totally unexpected improvement is achieved by incorporating high levels of certain oxidation inducing metal oxides in the frit by smelting same homogeneously into and throughout the fritted, glass matrix, which is later milled into a porcelain enamel and applied to an oven liner, requiring only Step 1 of Stiles' enamel examples, thereby enabling me to completely eliminate Steps 2–5 of Stiles' Examples 4, and 11–18 inclusive, and Steps 2–6 inclusive of Stiles' Example 10.

Too, by incorporating my oxidation inducing metal oxide into the glass matrix of my frit, it becomes fixed throughout the enamel coating in such a permanent manner that no amount of abrasion can ever remove it. That is, should the enamel coating wear or abrade with use, the homogeneous dispersion of oxidation inducing metal oxide throughout the entire enamel coating insures that there will always be readily available, at or near the surface of the coating, a supply of oxidation inducing metal oxide for oxidation of food soils.

Both the foregoing major advantages achieved by virtue of the unexpected improvement, contrary to the teaching of the art, of literally melting and completely submerging the oxidation inducing metal oxide into and homogeneously throughout the matrix of the glass frit, the basic component of a porcelain enamel oven coating.

Another advantage of incorporating my oxidation inducing oxides directly into the frit is that, since the oxide is going to be melted directly into the glass, highly refined grades thereof are not required, standard ceramic grade sufficing nicely.

Previously, vegetable oil spatters on an oven surface normally required temperatures of 800° F. to effectively oxidize them. The glass, porcelain enamel, or glaze made according to this invention will effectively oxidize and remove spatters at 500° F. with the time of exposure to heat being the same as previously required for oxidation at 800° F. Oxidation at lower temperatures approaching 350° F. can be achieved with the frits of this invention, but occurs at a reduced rate.

SUMMARY

Briefly stated, this invention relates to a greatly improved frit and method of utilizing same for producing a porcelain enamel oven lining coating, the vitreous frit component of which contains a total of preferably 15 to 55 weight percent, but which may vary, depending upon frit characteristics from about 10 to about 79 weight percent of one or more of the following oxidation inducing metal oxides:

cobalt
manganese
copper
chromium

Said frit subsequently milled into a porcelain enamel slip for application to and firing on the metal substrate which forms a cooling oven liner.

The general box-like structure of a cooking oven or broiler liner is so well known to the public that no graphic description of same is deemed necessary, and these are generally made of steel coated with porcelain enamel. However, as it is well known that porcelain enamel may be applied to any number of metallic substrates such as aluminum, stainless steel, etc., it is therefore within the realm of this invention to have an oven the apparatus disclosed in U.S. Pat. No. 2,976,723 and found to be within the range from 5 to 8 pounds. The pellets were then crushed to 20-40 mesh and impregnated with sufficient aqueous solution to result in the impregnated pellet containing, based on the weight of the impregnated pellet, 0.25 weight per cent platinum, 0.25 weight per cent lithium, and 0.15 weight per cent tin. The pellets were dried and tested for catalytic dehydrogenation activity at about 1,050° F. by introduction into a laboratory catalytic reactor operating at conditions of 1,235 v/v/hours normal butane feed, and 5,680 v/v/hours steam at 85 psig. The results of the catalytic conversion are given in Table I.

TABLE I

| Conversion, weight per cent | Selectivity to Olefin and Diolefin weight per cent |
|---|---|
| 44.7 | 96.0 |

EXAMPLE II

The practice of the invention was demonstrated by taking 0.52 mol of particulate ZnO with an average particle diameter of about 300 microns and admixing in a dry manner with 0.50 mol of flame-hydrolyzed ALON $Al_2O_3$ wherein the particle diameter was about 0.03 micron. The dry admixture was wet with 100 ml of deionized water, dried, pelleted into ⅛-inch pellets, calcined overnight at 1,000° C. and tested for strength in the same device as used in Example I. Pellet crushing strength was noted to be 26.2 pounds. The pellets were then impregnated in the same manner as in Example I and tested in the same catalytic reactor at the same conditions, the results of which are given in Table II.

TABLE II

| Conversion, weight per cent | Selectivity to Olefin and Diolefin weight per cent |
|---|---|
| 39.9 | 97.9 |

Analysis of the results of Table I as compared to Table II indicates that the high strength pellet of this invention demonstrated in Example II is an entirely suitable catalyst and contains approximately the same catalytic properties as the conventional low strength catalyst pellets demonstrated as a control in Example I. Thus, applicant has demonstrated that the high strength pellets of this invention are entirely satisfactory as a catalytic material.

EXAMPLE III

Additional runs were conducted in which the calcined time was varied. Specifically, in this example the same materials as in Example II were prepared in pellets in the same manner and calcined at 1,000° C. In a first run the calcining time was 1 hour and in a second run the calcining time was 16 hours. The pellets of run one, where the calcining time was 1 hour, had a crushing strength of 28 pounds when tested in the same device as in Example II, and the pellets of run two, which were subjected to a calcining time of 16 hours, exhibited a crushing strength of 26 pounds in the same device. It is noted that the catalyst pellets had a remarkably high crushing strength when calcined under these conditions.

EXAMPLE IV

Additional runs were made in which the calcining temperature was varied. Thus, the invention was practiced by preparing pellets according to the manner of Example II and calcining the pellets for 16 hours. In a first run the calcining temperature was 800° C. and in a second run the calcining temperature was 1,200° C. The tablets from the first run wherein the calcining temperature was 800° C. tested at 28 pounds crushing strength, while the tablets of the second run at 1,200° C. also tested at 28 pounds. Thus, applicant has demonstrated the production of high crush strength pellets over the indicated temperature range.

Various modifications of the invention can be made in view of the foregoing disclosure and the appended claims without departing from the spirit or scope thereof. Specifically, as noted earlier, the process for preparing the pellets can incorporate many additional steps and features without departing from the scope of the invention.

What is claimed is:

1. A method of preparing a zinc aluminate catalyst having a crush strength of at least 15 pounds measured by the apparatus of U.S. Pat. No. 2,976,723 comprising the steps of:
   a. admixing in the ratio of:
      1. one mol of particulate ZnO, wherein the average particle diameter is in the range of 0.1–1,000 microns, and
      2. about 0.7–1.1 mols of particulate flame-hydrolyzed $Al_2O_3$, said flame-hydrolyzed alumina comprising predominately gamma $Al_2O_3$, wherein the average particle diameter is in the range of about 0.01–1 micorn;
   b. pelletizing the admixture; and
   c. calcining the pellets at a temperature in the range of 600° to 1,500° C. for from 0.1 to 30 hours.

2. The method of claim 1 wherein the particle size of said ZnO is in the range of about 40–900 microns average particle diameter and the particle size of said flame-hydrolyzed $Al_2O_3$ is in the range from about 0.025–0.75 micron average particle diameter.

3. The method of claim 2 wherein said pelletized admixture is calcined at a temperature in the range of about 800°–1,200° C. for from 1–30 hours; and
   further comprising impregnating said calcined admixture with a metal catalyst.

4. The method of claim 3 further comprising the steps of:
   a. admixing in deionized water in the ratio of:
      1. about 0.52 mol of particulate ZnO, wherein said particle size is about 300 microns average particle diameter; with
      2. about 0.50 mol of particulate flame-hydrolyzed $Al_2O_3$, wherein said particle size is about 0.03 micron average particle diameter;
   b. drying said admixture;
   c. pelletizing said dried admixture into pellets;
   d. calcining said pellets at about 1,000° C. for about 16 hours;
   e. impregnating the pellets with sufficient aqueous solution to result in the impregnated pellets containing, based on the weight of the impregnated pellets, about 0.25 weight per cent platinum, about 0.25 weight per cent lithium, and about 0.15 weight per cent tin; and
   f. drying said impregnated pellets.

* * * * *

| | |
|---|---|
| ZnO | 4.2 |
| P$_2$O$_5$ | .6 |
| TiO$_2$ | 8.6 |
| Sb$_2$O$_5$ | 7.1 |

The resulting frit was then milled in a conventional ball mill using the following mill addition.

| | Wt.% |
|---|---|
| Glass (frit) | 100 |
| Polytran FS* | 1/2 |
| NaNO$_2$ | 1/2 |
| Water | 45 |

*POLYTRAN FS is a water-soluble bio-polymer composition containing scleroglucan, a high molecular weight polysaccharide produced by fermentation. The polymer structure is substantially a linear chain of anhydroglucose units linked beta 1-3. 30 to 35 percent of the linear chain units bear single appended anhydroglucose units linked beta 1-6.

This enamel was milled to a fineness of 10 grams/400 mesh/50 cc., then sprayed on a suitably prepared substrate at an application weight of 30 gms/sq. ft. The enamel was then fired at 1,450° F. for 3 minutes to a matte surface, and the enamels of this invention will normally be fired at temperatures lower than 1,600° F.

The foregoing mill addition is, as will be readily apparent, considered to be "clayless," and is applicable to either a ground coated metallic substrate, or by a direct-on process, to a suitably prepared metal substrate.

The frit containing the oxidation inducing metal oxide above was compared to a similar frit which contained no such oxide, as well as to a conventional oven enamel in the following test. In this and all subsequent examples, the standard of comparison was a blank enamel having substantially the same composition as that enamel of this invention being evaluated, except for the oxidation inducing metal oxide, along with a conventional oven enamel found in oven ranges heretofore, and which contained no oxidation inducing metal oxides at the levels utilized in the frit of this invention.

This and the following examples were evaluated by heating to 390° F., at which temperature 1 drop each of various types of food soils (shortening, meat renderings and sugar water) was placed on the hot sample with an eyedropper. The test samples were then heated at 550° F. for 2 hours.

At the end of this 2 hour period the samples were cooled and evaluated. The coating of this invention with the manganese dioxide smelted in had left no residual stain, while the two comparison standards containing no oxidation inducing metal oxides, had a tightly adhering, unsightly black residue where the food samples had been placed.

EXAMPLE 2

The following composition was weighed and mixed in a blender.

| | Parts by Wt. |
|---|---|
| Soda Ash | 400 |
| Sodium Nitrate | 137 |
| Cobalt Oxide | 1000 |
| Calcium Carbonate | 1030 |
| Quartz | 1036 |
| Zinc Oxide | 226 |

The foregoing mixture was then smelted at 2,350° F., quenched (fritted) in cold water, and dried in a drier at 200° F., the resultant frit having the following oxide weight percent composition:

Oxide Weight Percent

| | |
|---|---|
| Na$_2$O | 9.4 |
| CaO | 18.0 |
| SiO$_2$ | 33.2 |
| ZnO | 7.3 |
| CoO | 32.1 |

The frit was milled in a conventional ball mill using the following clayless mill addition:

| | Wt.% |
|---|---|
| Glass (frit) | 100 |
| Polytran FS | 1/2 |
| NaNO$_2$ | 1/2 |
| Water | 45 |

This enamel was milled to a fineness of 10 grams/400 mesh/50 cc., and sprayed on a suitable substrate at an application weight of 30 gms/sq. ft. The enamel was then fired at 1,400° F. for 3 minutes to obtain a matte surface.

The foregoing frit was evaluated to a blank standard, and a conventional oven enamel according to the procedures of Example 1. At the end of this 2 hour test period the samples were cooled and compared. The glass with the smelted-in cobalt had no residual stain, while the sample of a conventional enamel, and the standard minus cobalt had a tightly adhering black residue.

EXAMPLE 3

A glass with the following raw batch composition was batch weighed and mixed in a blender.

| | Parts by Wt. |
|---|---|
| Soda Ash | 543 |
| Sodium Nitrate | 79 |
| Potassium Carbonate | 97 |
| Barium Carbonate | 131 |
| Cobalt Oxide | 1000 |
| Lithium Carbonate | 138 |
| Silica | 629 |
| Titania | 318 |
| Litharge | 821 |
| Antimony Oxide | 64 |

The mixture was then smelted at 2,200° F. for 40 minutes, quenched in cold water and dried in a drier at 200° F., the resultant frit having the following oxide weight percent composition:

Oxide Weight Percent

| | |
|---|---|
| Na$_2$O | 10.1 |
| K$_2$O | 1.9 |
| TiO$_2$ | 9.4 |
| Li$_2$O | 1.6 |
| BaO | 2.9 |
| PbO | 24.2 |
| Sb$_2$O$_5$ | 1.9 |
| SiO$_2$ | 18.5 |
| Co$_2$O$_3$ | 29.5 |

The frit was then milled in a conventional ball mill using the following mill addition:

| | Wt.% |
|---|---|
| Glass (frit) | 100 |
| Clay | 4 |
| Bentonite | 3/8 |
| K$_2$CO$_3$ | 1/8 |
| *Keltex | 1/16 |
| Alumina | 20 |
| Water | 55 |

*An aliginate manufactured by the Kelco Co., similar in function to gum tragacanth.

This enamel was milled to a fineness of 10 grams/400 mesh/50 cc., then sprayed on a suitably prepared substrate at an application weight of 30 gms/sq. ft., then fired at 1,450° F. for 3 minutes to obtain a matte surface.

As stated above, it is desirable that the enamels of this invention, to be most effective, have either a matte or semi-matte sheen, or surface, and the frits of Examples 1 and 2 were of the so-called "self-matting" type. The frit of Example 3, on the other hand, would normally fire out to a relatively high gloss and the inclusion of 20 weight percent alumina in the mill addition had the effect of promoting in the final enamel coating the required degree of matteness.

The samples were evaluated following the same procedure as in Example 1. At the end of the 2 hour test period the samples were cooled and evaluated. The glass with the smelted-in cobalt had no residual stain, while samples of the conventional enamel and the blank standard had tightly adhering black residues where the food samples had been applied.

EXAMPLE 4

To demonstrate that a relatively simple glass is adaptable to the practice of this invention, the following composition was weighed and mixed in a blender.

|  | Parts by Wt. |
|---|---|
| Barium Carbonate | 520 |
| Cobalt Oxide | 1328 |
| Boric Acid | 730 |

This glass was then smelted at 2,500° F. for 50 minutes, quenched in cold water and dried in a drier at 200° F., the resultant frit having the following oxide weight percent composition:

Oxide Weight Percent

| BaO | 18 |
|---|---|
| $B_2O_3$ | 19 |
| CoO | 63 |

The frit was then milled in a conventional ball mill using the following mill addition:

|  | Wt.% |
|---|---|
| Glass (frit) | 100 |
| Polytran FS | 1/2 |
| $NaNO_2$ | 1/2 |
| Water | 45 |

This enamel was milled to a fineness of 10 grams/400 mesh/50 cc., then sprayed on a suitably prepared substrate at an application weight of 30 gms/sq. ft., then fired at 1,500° F. for 2 minutes to obtain a matte surface.

These samples were evaluated using the same procedure as in Example 1. After the cleaning cycle the glass with smelted-in cobalt oxide was substantially free of residual stain, while samples of conventional enamel and the blank standard had a tightly adhering black deposit.

EXAMPLE 5

A matting glass with the following composition was weighed and mixed in a blender.

|  | Parts by Wt. |
|---|---|
| Borax | 135 |
| Soda Ash | 192 |
| Potassium Carbonate | 238 |
| Barium Carbonate | 66 |
| Manganese Dioxide | 280 |
| Potters Whiting | 24 |
| Lithium Carbonate | 60 |
| Powdered Quartz | 1000 |
| Zinc Oxide | 119 |
| Sodium Tripoly Phosphate | 100 |
| Antimony Oxide | 203 |
| Titanium | 245 |

The mixture was then smelted at 2,350° F. for 40 minutes, quenched in cold water and dried in a drier at 200° F., the resultant frit having the following oxide weight percent composition:

Oxide Weight Percent

| $B_2O_3$ | 3.63 |
|---|---|
| $Na_2O$ | 8.01 |
| $K_2O$ | 6.64 |
| BaO | 2.10 |
| CaO | 0.54 |
| $Li_2O$ | 0.99 |
| $MnO_2$ | 10.00 |
| $P_2O_5$ | 2.38 |
| $SiO_2$ | 41.37 |
| $TiO_2$ | 10.13 |
| ZnO | 4.90 |
| $Sb_2O_5$ | 9.31 |

The frit was then milled in a conventional ball mill using the following mill addition:

|  | Wt.% |
|---|---|
| Glass (frit) | 100 |
| Polytran FS | 1/2 |
| $NaNO_2$ | 1/2 |
| Water | 45 |

This enamel was milled to a fineness of 10 grams/400 mesh/50 cc., then sprayed on a suitable prepared substrate at an application weight of 30 gms/sq. ft., then fired at 1,400° F. for 3 minutes to obtain a matte surface.

The samples were evaluated following the same procedure as in Example 1. At the end of the 2 hour test period the samples were cooled and evaluated. The glass with 10 percent manganese smelted in had left no residual stain while a sample of a conventional enamel had a tightly adhering black deposit.

As stated above, the composition of the frits useful to this invention is not overly critical and this fact will be supported by setting forth in Table II below the ranges of various oxide components spanned by Examples 1–5.

TABLE II

Frit Oxide Composition Parts by Weight

|  | Wt./% |
|---|---|
| BaO | 0–18 |
| $B_2O_3$ | 0–19 |
| CaO | 0–18 |
| $K_2O$ | 0–7 |
| $Li_2O$ | 0–2 |
| $Na_2O$ | 0–10 |
| $P_2O_5$ | 0–3 |
| $Sb_2O_5$ | 0–10 |
| $SiO_2$ | 0–42 |
| $TiO_2$ | 0–10 |
| ZnO | 0–8 |
| PbO | 0–24 |
| Oxidation inducing metal* oxides | 10–63 |

The foregoing components totalling 100 as they vary within the ranges indicated.

*Cobalt, manganese, copper or chromium.

While I have demonstrated a utility for this class of vitreous coatings in connection with self-cleaning cooking ovens, it is to be understood that the ability of a vitreous coating such as mine to oxidize organic compounds would also have wide application in a number of different fields, for example, utilization of my enamel in connection with exhaust systems for paint baking ovens whereby the vapors, prior to being discharged into the open atmosphere, would be exposed to a series of heated surfaces covered with my porcelain enamel and thereby oxidized to unobjectionable compounds from the standpoint of air pollution. The same theory would apply to automotive exhaust systems, the interiors of which could be coated with my enamel to render certain products of combustion less noxious and objectionable prior to their discharge into the atmosphere.

The ability of these coatings to oxidize organics is a function of time, temperature and the type of organic to be oxidized.

Generally little or no effective oxidation can be achieved below a temperature of 350° F. It is contemplated that the upper temperature limit of oxidation utilizing my coating would be in the vicinity of 600° F. This providing the added advantage that extensive safety and locking devices are not considered necessary at this temperature, inasmuch as the likelihood of an explosion resulting from the sudden availability of excess oxygen due to inadvertent opening of the oven door is considered to be materially reduced within this range whereas, at the higher temperatures required for previous methods of heat oxidation of oven soils, there was always the ever present danger of such explosion, requiring the inclusion in the appliance of a safety locking device for the oven door, to be utilized during the oxidation process.

From the foregoing working examples, except as the percentage of oxidation inducing oxide in the frit may be reduced by mill added components, such as alumina in Example 4, the weight percent of the oxidation inducing oxide will occur in the final, fired, enamel coating in substantially the same weight percent as in the frit.

Having thus described and illustrated my invention, it is set forth in the following claims which are to be construed in the light of the United States statutes and decisions in such a manner as to give them the broad range of equivalents to which they are entitled.

I therefore claim:

1. A porcelain enamel, substantially amorphous frit adaptable to be applied to a metallic substrate and fired thereon at a temperature less than 1,600° F., in the form of a matte to semi-matte porcelain enamel coating, adaptable to oxidize organic soils thereon at a temperature of from about 350° to about 600° F., said frit having homogeneously smelted therethroughout at least one oxidation inducing oxide selected from the group consisting of Co, Mn, Cu, and Cr in an amount, singly or in combination, totalling from about 10 to 70 weight percent of said frit.

2. The frit of claim 1 wherein said oxidation inducing oxide is present in said frit in from about 15 to about 55 weight percent.

3. A substantially amorphous porcelain enamel frit adaptable to be applied over a metallic substrate and fired thereon at a temperature less than 1,600° F., in the form of a matte to semi-matte porcelain enamel coating adaptable to oxidize organic soils thereon when heated to a temperature of from about 350° to about 600° F., said frit characterized by having homogeneously smelted throughout at least one oxidation inducing oxide selected from the group consisting of Co, Mn and Cu, singly or in combination, and additionally the oxidation inducing oxide Cr, the total combined amount of oxidation inducing oxides ranging from 10 to about 70 weight percent of said frit, the total weight percent of said Co, Mn and Cu, singly or in combination, being at least 5 weight percent of said frit.

4. The frit of claim 3 wherein the total of said oxidation inducing oxides in said frit ranges from about 15 to about 55 weight percent.

* * * * *